3,749,586
CENTERING METHOD
Lee Jerome Nahm, Jr., St. Louis, Mo., assignor to Ralston Purina Company, St. Louis, Mo.
No Drawing. Filed Mar. 15, 1971, Ser. No. 124,516
Int. Cl. A23l 1/32
U.S. Cl. 99—113                                    8 Claims

ABSTRACT OF THE DISCLOSURE

A method for substantially surrounding a discrete interior body portion with a coagulable material is disclosed. A predetermined quantity of the coagulable material is placed into a container and the container is heated for a sufficient period of time to partially coagulate the coagulable material about the inner periphery of the container. The discrete body portion is then inserted into the liquid center of the partially coagulated material and thereafter the container is heated to completely coagulate the coagulable material and substantially center the discrete body therein.

BACKGROUND OF THE INVENTION

This invention relates to a method of manufacturing a product to center a solid portion within a heat coagulable material in a continuous operation. More particularly, the present invention is related to a method of manufacturing a cooked egg roll product with the yolk centered therein. However, the present invention could also be utilized for centering other similar type products.

In the manufacture of an egg roll product it is desirable to have the yolk portion centered in the albumen portion. In the past, one of the methods utilized to achieve this finalized product in its desired form required that the yolk portion be fixedly positioned before the albumen portion was formed around the yolk portion. This fixed positioning of the yolk required the holding of the yolk portion in the center of a casing by means of pins. This casing would later be filled with albumen which was coagulated and cooked about the yolk. This pinning operation to insure that the yolk portion was centralized was undesirable since it required an additional manual operation which increased the cost of producing such an egg product. Another of the prior art attempts to insure that the yolk portion would be centralized in the albumen required the use of an interior sleeve or mold. The liquid albumen would be coagulated into its desired shape and then the interior mold would be removed and the liquid yolk would be supplied to the interior area. However, this was undesirable since it required the burden of removing the interior mold before the yolk portion could be placed in the egg roll. It was also undesirable because the albumen portion was subjected to an additional heating or cooking operation to effect the coagulation of the liquid yolk portion which was placed in the interior of the previously coagulated albumen portion. This use of a central mold member has also been used to achieve the centering of a cheese yolk body within a sausage material.

Still other prior art attempts to centralize the yolk within an egg roll have required that the yolk be extruded concentrically within the extrusion of the albumen or that the roll be rotated about its main axis which is maintained horizontal during the coagulation. Both of these methods of centering the yolk within the albumen required elaborate machinery.

In accordance with this invention, it is possible to overcome these manual operations and still insure that the yolk portion of the egg roll will be centralized in the albumen. In addition, the method disclosed herein may be performed without the necessity of using elaborate or expensive machinery. This invention makes it possible to achieve this desired result by subjecting a container having a predetermined quantity of liquid heat coagulable material therein to a heating operation to partially coagulate the material to a predetermined degree about the inner periphery of the container, inserting the solid material to be centered within the coagulable material into the liquid portion of the partially coagulated material and thereafter completely coagulating the coagulable material to substantially center the solid material within the coagulable material.

SUMMARY OF THE INVENTION

It is, therefore, the general object of the present invention to provide a method for producing a product which includes a simplified manner of centralizing a discrete inner portion in coagulable material.

Another object of the present invention is to provide a method having a single operation for substantially centralizing the yolk portion of an egg roll within the albumen while cooking the egg roll.

Briefly, the preferred embodiment of the present invention constitutes the method of producing an egg roll having the yolk portion substantially centered within the albumen portion comprising the steps of placing a predetermined quantity of liquid albumen into a container, and heating said container so that the albumen coagulates to a predetermined degree about the inner periphery of the container, inserting a yolk body into the liquid portion of the partially coagulated albumen and thereafter completing the coagulation of the albumen substantially concentrically about the yolk body.

These and other objects and advantages will become apparent hereinafter.

DESCRIPTION OF THE PREFERRED EMBODIMENTS

The subject invention will be described in terms of centering a yolk body within the albumen of an egg roll product. However, it should be realized that the present invention may also be utilized for centering other discrete inner bodies within a coagulable material, such as surrounding a sausage stick with a cheese or surrounding a sausage stick with a gelatin or fat to form a sausage product having a coating thereon. Therefore, even though the following description will be directed to forming an egg roll product for ease of explanation and as the preferred embodiment of the present invention, the subject invention should not be so limited.

It is well-known to produce egg roll products of the type described herein. Conveniently, the egg roll is formed in a container or casing which will be a standard sausage casing made of regenerated cellulose coated with saran, or other suitable material. One end of the container is closed or sealed and the other end thereof is open for receiving a predetermined quantity of liquid albumen. The liquid albumen may be raw egg white, or egg albumen prepared in accordance with U.S. Pat. No. 3,510,315 issued May 5, 1970, or may be prepaerd in accordance with other desired manners of treating egg albumen for use in such products.

The container is thus suspended or held in a substantially vertical position and the predetermined quantity of the liquid albumen supplied thereto. The albumen is then partially coagulated or coagulated to a predetermined degree so that the albumen is coagulated about the inner periphery of the container while the central portion of the albumen remains in a substantially liquid condition. Preferably, the coagulation of the albumen is effected by passing the container through a heated liquid bath having a temperature of approximately 160° F. to 210° F. The container should be held or positioned so that the heated bath liquid does not enter the open end of the container. The container should be heated for a sufficient period of time to achieve the desired partial coagulation of the albumen, i.e., coagulation about the inner periphery of the casing with the center portion of the albumen remaining in a substantially liquid condition. For a container having a diameter of approximately 1¾ inches into which a yolk body having approximately a 1 inch diameter is to be placed, the heating of the albumen should be for a period of about 2 to 4 minutes. It should be realized that this coagulation time will depend upon the size of the container and the size of the yolk body to be centered within the albumen. Other heat sources may also be utilized for achieving the coagulation of the albumen or alternatively the coagulation of the albumen may be accomplished by freezing such as passing the container through an air blast freezer. After the albumen has coagulated to the desired degree, a yolk body is inserted into the substantially liquid center portion of the albumen. The yolk body may be formed of crystallized yolk, i.e., yolks which have been cooked in their own membranes, and then compressed together by extrusion or may be formed of non-crystallized yolks, i.e., yolks which have been cooked out of their natural membrane, comminuted to eliminate this gel formation therein and then compressed together and cooked. Both of these methods of forming a solid egg yolk body having a crumbly texture are well-known in the art. It should be realized that, if desired, other methods may be utilized in preparing the solid egg yolk body. The insertion of the yolk body into the liquid center portion of the albumen serves to displace the albumen to completely enclose or cover the yolk body. Additionally, due to the partial coagulation of the albumen, the yolk body is substantially centrally located within the albumen. The other end of the casing or container is then sealed or closed to confine the solid yolk body and albumen therein. After the sealing of the container, the container is heated in order to effect the complete coagulation or cooking of the albumen. It is preferable that the heating take place by immersing the container into a heated liquid bath having a temperature of approximately 160° F. to 210° F. for a period of approximately 15 to 25 minutes. This additional heating step does not necessarily have to be performed during the movement of the egg roll since the egg roll can be cooked during either the movement thereof or in a static condition after the initial coagulation of the albumen substantially concentrically within the casing and before insertion of the yolk body. Additionally, it should be understood that since the casing is now sealed at both ends it is no longer necessary to maintain the casing in a substantially vertical position. If desired, other means of heating the casing to complete the coagulation of the albumen therein could be utilized. The time of cooking and the temperature of the egg roll should be carefully regulated to avoid a green discoloration appearing at the interface between the egg yolk body and albumen. The longer the egg roll is heated after the albumen is substantially coagulated the greater the incidence of green discoloration might be. The temperature of the albumen should be in the range of 148° F. to 200° F. on completion of the heating step and preferably the temperautre is between 160° F. and 180° F. Also, as previously mentioned, the coagulation may be obtained by freezing rather than heating.

If desired, an insert may be utilized to form or displace the albumen to the desired configuration prior to the initial heating of the albumen to partially coagulate the albumen. This initial displacement of the albumen serves to pre-form the albumen so that the yolk body may be more readily received within the partially coagulated albumen. The insert should have a size and shape substantially conforming to that of the yolk body. The insert may be provided with a coating to prevent the coagulation of the albumen thereon, or the insert may be rotated during the heating to prevent the coagulation of the albumen at the center thereof. Other suitable means may be utilized to prevent the coagulation of the albumen in the center of the casing. The insert is then removed following the initial or partial coagulation of the albumen. As is obvious when the insert is used to displace the albumen, the partial coagulation of the albumen serves to form a natural cavity or opening for receiving the yolk body. It should be understood that the center portion of the albumen about the insert should remain in a liquid condition so that when the yolk body is inserted the albumen is displaced about the yolk body. Following removal of the insert, the yolk body is then placed within the liquid portion of the albumen interiorly of the coagulated albumen, the container sealed and the egg roll processed as hereinbefore described.

From the foregoing, it is now apparent that a novel process for substantially centralizing the yolk body in the albumen portion of an egg roll product meeting the objectives set out hereinbefore has been disclosed and that changes or modification as to the process set forth in the disclosure by way of illustration may be made by those skilled in the art without departing from the spirit of the invention as defined by the claims which follow.

We claim:

1. A method for substantially centering the yolk body in the albumen portion of an egg roll product comprising the steps of: placing a predetermined quantity of liquid albumen into a container, heating said container a first time for a sufficient period of time to coagulate the portion of the albumen about the inner periphery of the container, inserting a coagulated yolk body into the uncoagulated portion of the albumen and displacing the uncoagulated albumen to enclose the yolk body, sealing the container, and heating said container a second time for a sufficient period of time to totally coagulate the albumen substantially concentrically about the yolk body.

2. The method according to claim 1 wherein the first heating step is carried out by placing the container in a heated bath having a temperature of approximately 160° F. to 210° F. for approximately 2–4 minutes.

3. The method according to claim 2 wherein the second heating step is carried out by placing the container in a heated bath having a temperature of approximately 160° F. to 210° F. for approximately 15–25 minutes.

4. The method according to claim 1 wherein the first heating step is carried out by placing the container in a heated liquid bath having a temperature of approximately 160° F. to 210° F. for a sufficient period of time to coagulate the portion of the albumen about the inner periphery of the container.

5. The method according to claim 1 including the step of inserting a mold member into the liquid albumen to displace the albumen prior to the first heating step, removing the mold member after the coagulation of a portion of tthe albumen and inserting the coagulated yolk body into the area previously occupied by the mold member and displacing the uncoagulated albumen to enclose the yolk body.

6. A method for substantially centering the yolk body in the albumen portion of an egg roll product comprising the steps of: suspending a container having a predetermined amount of liquid alubmen therein in a substantially vertical position, heating said container to a temperature of approximately 160° F. to 210° F. for a sufficient period of time to partially coagulate the albumen about the inner periphery of thhe container while the center portion of the albumen remains substantially fluid, inserting a coagulated solid yolk body into the fluid portion of the albumen and displacing the fluid albumen, sealing the container and thereafter placing the container in a heating medium to totally coagulate the albumen substantially concentrically about the yolk body.

7. The method according to claim 6 wherein the step of totally coagulating the albumen is carried out by placing the container in a heated bath having a temperature of approximately 160° F. to 210° F. for approximately 15 to 25 minutes.

8. A method of substantially centralizing a discrete body within a coagulable material comprising the steps of: placing a predetermined quantity of the coagulable material in the liquid state into the container, partially coagulating the coagulable material about the inner periphery of the container while the center of the material remains substantially in the liquid state, inserting the discrete body into the liquid portion of the coagulable material and displacing the liquid material and thereafter completing the coagulation of the coagulable material about the discrete body to substantially centralize the discrete body therein.

References Cited

UNITED STATES PATENTS 2,421,199    5/1947    Gutmann    99—161
3,493,393    2/1970    Shires    99—113

A. LOUIS MONACELL, Primary Examiner

R. M. ELLIOTT, Assistant Examiner

U.S. Cl. X.R.

99—177